Patented Oct. 7, 1947

2,428,353

UNITED STATES PATENT OFFICE 2,428,353

LOWER ALIPHATIC ESTERS OF ETHYLENE- AND PROPYLENE-DIAMINE N,N'-TETRA-ACETIC ACIDS

Frederick C. Bersworth, Verona, N. J.

No Drawing. Application June 21, 1943, Serial No. 491,670

8 Claims. (Cl. 260—482)

This invention relates to the production of amino acid esters. More particularly, it relates to a process for producing esters of polycarboxylic amino acids, and to the products so prepared.

The esterification of amino acids has always been difficult. Although some of the esters of primary alpha amino acids, such as the amino acids of the proteins, have been prepared, esters of the more complex amino acids, especially of the polycarboxylic amino acids, have not, so far as I am aware. In methods hitherto employed for esterifying amino acids, it has been customary to pass HCl gas into a mixture of the desired alcohol and amino acid as the mixture is heated. However, gaseous HCl is inconveneint to use, and the yields obtained with it are often poor. When attempts are made to esterify amino acids, particularly polycarboxylic amino acids, with a sulfuric acid catalyst in the manner used in esterifying ordinary organic acids, trouble is encountered due to the basic nature of the amino group in the amino acid. If small amounts of sulfuric acid are used, the amino groups react with or neutralize it and no esterification takes place; if large amounts of sulfuric acid are used many side reactions are likely to occur between the acid and the organic substances present, resulting in poor yield and off-color products. When the resulting esters are such that they are non-volatile and so high boiling that they cannot be distilled, the non-volatile foreign bodies introduced by these side reactions may be removed only with the greatest difficulty.

It is an object of this invention to prepare the esters of amino acids, and in particular of polycarboxylic amino acids.

Another object is to prepare these esters by a simple and easily performed process whereby good yields are obtained, with relatively little by-product formation.

Still another object is to produce esters of polycarboxylic amino acids, which esters have not been previously known and which are of particular commercial value.

Briefly, the process of this invention may be accomplished by reacting a polycarboxylic amino acid with an alcohol in the presence of sufficient strong mineral acid to form the amino acid-mineral acid addition product, the reaction being carried out so that water resulting from the esterification reaction is driven off, and at the completion of the reaction, any excess alcohol is removed by distillation, leaving the ester usually in the form of an addition product with the mineral acid. This product may then be washed with an alkaline solution to neutralize, and permit separation of the mineral acid. Alternatively, the washing step may be carried out before distilling off the alcohol.

In order to prevent undesired side reactions it has been found preferable, although not absolutely necessary, to combine the mineral acid and the amino acid to give an addition product and then reacting this addition product with the alcohol.

The amino acids which are esterified in accordance with the procedure of the present invention are, as already stated, polycarboxylic amino acids. They may be prepared, for example, in accordance with my copending application, Serial No. 491,669, filed June 21, 1943. The particular polycarboxylic amino acids with which the procedure of the present invention is concerned are those having at least one secondary or tertiary amino nitrogen atom, and also at least two carboxyl groups —COOH, each carboxyl group being separated from every other carboxyl group in the amino acid by at least one of said secondary or tertiary amino nitrogen atoms. The prefix "poly" is used in its broad sense meaning "more than one."

The present invention is accordingly not concerned with the well-known amino acids such as glycine, leucine, cysteine, aspartic acid, histidine, and lycine, which commonly occur as structural units in the proteins and peptides. These amino acids do not fulfill the requirements set forth above.

The polycarboxylic amino acids to which the present invention refers may be represented by the general formula (1) 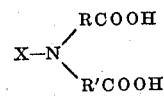

wherein R and R' are the same or different organic radicals and X is an organic radical or hydrogen. Hence X may or may not contain a carboxyl group or groups.

The preferred type of polycarboxylic amino acids within the above-defined group is characterized by containing at least two —CH$_2$COOH radicals, each attached to the same or a different amino nitrogen atom in the molecule. These preferred polycarboxylic amino acids may be represented by the formula (2) 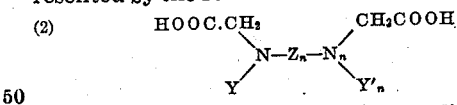

wherein Y and Y' are the same or different and are either hydrogen, —CH$_2$COOH, an alkyl group, a cycloalkyl group, or an alkylol group; $n$ is a number not greater than 1, each $n$ being the same, and when $n$=zero, the formula becomes that of a polycarboxylic monoamino acid:

(3) 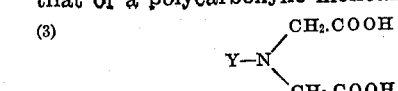

The symbol $Z_n$ in Formula 2 is either an alkylene group, an alkylene-ether group, an alkylol group, or the radical of a polyalkylene polyamine in which latter case the amino nitrogen atoms intermediate the polyalkyene polyamine chain are attached either to a hydrogen atom or to a —CH₂COOH group.

Of particular interest are the esters of the amino tetra- (or higher) acetic acids—i. e., of those acids corresponding to Formula 2 wherein Y and Y' are —CH₂COOH. These esters, which so far as I am aware have never been prepared before, are useful notably in plastics formulation, and for other purposes.

Specific examples of the polycarboxylic amino acids which may be esterified by the process of the present invention include ethylene diamine N,N'-tetraacetic acid; propylene 1,2-diamine N,N'-tetraacetic acid; 1,3-diamino propanol-2 N,N'-tetraacetic acid; diethylene triamine N,N'-tetraacetic acid; diethylene triamine N,N',N''-pentaacetic acid; hexamethylene diamine N,N'-tetraacetic acid; cyclohexyl amine N-diacetic acid; α-butyl amine N-diacetic acid; ethylene diamine N,N'-diacetic acid; dipropylene triamine N,N'-tetraacetic acid; ethylene diamine N,N'-triacetic acid N'-ethanol;

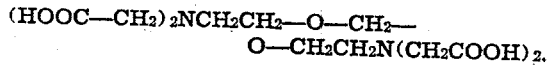

(HOOC—CH₂)₂NCH₂CH₂—O—CH₂—O—CH₂CH₂N(CH₂COOH)₂.

Although the correct amount of any strong mineral acid which is non-injurious to the reactants under the conditions imposed is suitable in the procedure of this invention, sulfuric acid is preferred, except in cases where the alcohol is sensitive to it, as stated in more detail below. Hydrochloric acid can be used in place of sulfuric, if desired, although the reaction generally goes less effectively when hydrochloric acid is used. To be effective the acid should be stronger than phosphoric, H₃PO₄.

It has been found that if the pH of the amino acid-mineral acid addition product is brought to or below pH=0—that is, the strength of the mineral acid is brought to at least 1N, and preferably about 4N—the amino acid-mineral acid addition product may be crystallized from solution. The crystals formed will then always contain the correct amount of acid for the esterification process regardless of the excess acid which has been used, since any excess acid will be removed by filtration from the crystals or by equivalent treatment. In determining the amount of mineral acid which fulfills the foregoing requirement, the properties of the particular amino acid and the particular mineral acid must be considered. In general, the amount of the mineral acid must exceed the equivalent amount of amino nitrogen present in the amino acid. At least an equivalent amount is necessary to overcome the basicity of the amino nitrogen, and somewhat of an excess is necessary to prevent hydrolysis and to serve as a catalyst for the esterification reaction. In the case of ethylene diamine N,N'-tetraacetic acid and sulfuric acid, two amino nitrogen atoms are present which require two hydrogen atoms and, as sulfuric acid is bivalent, one mol of ethylene diamine N,N'-tetraacetic acid requires one mol of sulfuric acid. In actual practice considerable excess of sulfuric acid is preferably added to the amino acid to prevent hydrolysis, and the resulting crystals of amino acid-mineral acid addition product contain about 50% more acid than theoretical, i. e., one mol of ethylene diamine N,N'-tetraacetic acid forms crystals with about 1½ mols of sulfuric acid. In addition, in an aqueous solution sufficient sulfuric acid should preferably be present so that the resulting composition is about 4 N with respect to sulfuric acid in order to assure proper crystallization and to prevent hydrolysis, though any amount in excess of this is not harmful and the mineral acid contents of the crystals are the same. Once the amino acid-mineral acid addition product has been formed, crystallized, and dried, the amount of acid in the crystals may, if desired, be determined. Between about 1.1 and 2 mols of sulfuric acid to 1 mol of ethylene diamine N,N'-tetraacetic acid will always be found present. This is the desirable range of sulfuric acid which should be present when the amino acid is reacted with the alcohol. Likewise, if a mono amino polycarboxylic acid is used, half as many mols of sulfuric acid will be needed to form the addition product. When hydrochloric acid is used instead of sulfuric, the molar amount must be doubled. In other words, the amount of mineral acid used in forming an addition product with a polycarboxylic acid is such that the number of equivalents of said mineral acid so used per mol of amino acid equal at least about 1.1 times the number of amino nitrogen atoms per molecule of said polycarboxylic amino acid.

In the preferred method the alcohol is reacted with the crystalline amino acid-mineral acid addition product formed as described above. Alternatively, the ester may be prepared by thoroughly mixing the predetermined proper amount of diluted sulfuric acid with the amino acid, and reacting the resulting composition with the alcohol, with simultaneous removal of the water of solution and the water of formation of the ester. Use of the crystals is, however, preferred for several reasons. They provide the exact composition for the reaction with the alcohol, thus eliminating possible errors; furthermore, impurities that may be in the amino acid are largely eliminated by this crystallization procedure.

Another method of preparing the crystalline amino acid-mineral acid addition product is to treat the dry crystalline amino acid with substantially anhydrous mineral acid, in the predetermined amount, for example, one mol of ethylene diamine N,N'-tetraacetic acid with 1.1 to 2 mols of sulfuric acid in the form of 96% acid. When these are mixed together, a substantially dry crystalline powder is formed. This procedure avoids the necessity for drying, and the presence of extra water.

In carrying out the process of this invention, any alcohol containing at least one esterifiable —OH group attached to a carbon atom which is not part of a benzene ring may be used. Compounds wherein the —OH group is attached to a carbon atom which is part of a benzene ring are properly phenols rather than alcohols, and are not included within the present invention.

Certain alcohols are more or less sensitive to sulfuric acid such as some of the polyhydric alcohols, e. g., glycerine and the mono ethyl ether of ethylene glycol, and when employing them it is preferable to use a mineral acid such as hydrochloric acid, toward which these alcohols are not sensitive.

In carrying out the esterification procedure, the alcohol is mixed with the polycarboxylic amino acid and the mineral acid which are preferably in the form of the addition product as already described, and the mixture is heated, preferably to boiling. Water is formed by the esterification reaction, and this water, together with any water initially present, passes off together with some of the alcohol (the amount of which depends upon its boiling point). The water should be removed continuously in order to prevent hydrolysis of the ester. Loss of alcohol should, however, be prevented as far as possible. Therefore the water and alcohol should be separated, the water withdrawn and the alcohol returned to the reaction mixture. When the alcohol is immiscible with water they may be separated, after condensation, by a trap. When they are miscible, any of the known methods of separating alcohol and water may be used for this purpose—for example, use of a fractionating column, chemical dehydration or salting out, or use of a water immiscible third substance.

After this esterification reaction, the mineral acid (which is usually then present as some form of addition product with the ester) is removed from association with the ester by treating the reaction with a mild alkali, e. g., sodium carbonate. The resulting salt of the alkali and the mineral acid is then separated from the ester by known methods, e. g., by washing with water. Excess alcohol (which is ordinarily present because it is preferable to employ an excess of the alcohol in making the ester when all carboxylic acid groups are to be esterified) may be removed by distillation or other suitable means; this may be done before or after the neutralization step.

In order to more fully understand the invention, but not to limit it, the following examples are given:

*Example I.—Preparation of the tetrabutyl ester of ethylene diamine tetraacetic acid*

Step 1.—Preparation of the amino acid-mineral acid addition product.

2 mols of 96% sulfuric acid diluted with 1000 cc. of water are used to dissolve ¼ mol of anhydrous ethylene diamine N,N'-tetraacetic acid at the boiling temperature of the aqueous acid. Upon cooling, the amino acid-sulfuric acid addition product is crystallized out, filtered, and dried at 110° C. Combined and free sulfuric acid is found to be about 1½ mols per mol of the amino acid, or ⅜ of a mol of sulfuric acid on the amount of amino acid used.

Step 2.—Esterification.

214 grams of the crystalline addition product prepared by Step 1 are mixed with 428 cc. of normal butanol and heated to boiling. Water is removed, for example by a trap reflux, as the reaction continues and when water is no longer evolved, the reaction is complete. The resulting reaction mixture is then shaken with dilute sodium carbonate solution, the aqueous layer is removed, and the excess butanol distilled off. Alternatively, the excess butanol may be distilled off before treating with the sodium carbonate. The residue is a clear, brownish-yellow liquid consisting of almost pure tetra-n-butyl ester of ethylene diamine N,N'-tetraacetic acid. Yield of product is over 90% of theory. The product has the formula:

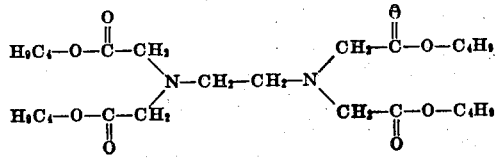

If desired, lesser amounts of the alcohol may be used, resulting in the mono-, di-, or tri-ester or mixtures of these.

By proceeding in the manner of the foregoing example, other alcohols may be reacted with the herein-described amino polycarboxylic acids, in conjunction with strong mineral acids, to produce the corresponding esters of those amino acids.

To illustrate in further detail the foregoing statement, the following examples are given:

*Example II.—Preparation of methyl esters of ethylene diamine tetraacetic acid*

302 cc. of anhydrous methyl alcohol is mixed cold with 30 cc. of 93% $H_2SO_4$. To this is added 42 grams of ethylene diamine tetraacetic acid, and the mixture heated on a steam bath under a reflux condenser for 2 to 2½ hours. (No attempt is made to remove water introduced into the reaction with the $H_2SO_4$ or water of reaction.) The mixture is allowed to cool, and the excess alcohol filtered off. The yield is 260 grams of the ester sulfate as compared with the theoretical yield of 264 grams. The $H_2SO_4$ is then neutralized with $Na_2CO_3$ or $BaCO_3$ (this step may be performed either before or after the removal of the alcohol).

The product formed, when $Na_2CO_3$ is used to neutralize, is the monosodium salt of the trimethyl ester of ethylene diamine tetraacetic acid,

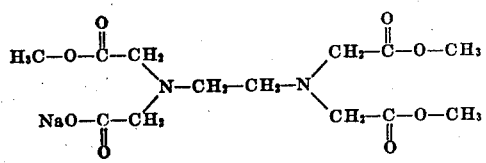

If barium carbonate is used to neutralize, the corresponding barium salt will be formed, containing of course two of the above molecules joined together through one barium atom in place of sodium.

The ester sulfate is a solid, while the ester shown in the foregoing formula is a clear mobile liquid with a boiling point so high that it cannot be distilled.

The monosodium (or other metal) salt of the trimethyl ester may be converted into the trimethyl ester of ethylene diamine tetraacetic acid by treating that salt with a mild acid, thereby converting the NaO-group to an HO-group.

It will be noted that removal of water was not necessary for the formation of the trimethyl ester, although such removal may be carried out if desired. However, to make the tetramethyl ester, water removal is necessary in the manner already described herein. Specifically, benzene or toluene may be introduced and the reaction mixture heated to remove the water.

*Example III.—Preparation of the tetraisopropyl ester of 1,2-propylene diamine tetraacetic acid*

10 grams of 1,2-propylene diamine tetraacetic acid, 6 cc. of $H_2SO_4$ 93%, and 80 cc. of anhydrous isopropyl alcohol are made into a paste. This paste, which melts at about 50° C., is heated at 60° C. for about 3 hours under a reflux condenser. The excess alcohol is removed and the acid neutralized with $Na_2CO_3$. A yield of 75%, based on the amino acid used, of the tetraisopropyl ester of 1,2-propylene diamine tetraacetic acid is obtained. The product is a viscous light colored liquid which is somewhat soluble in water, and has the formula

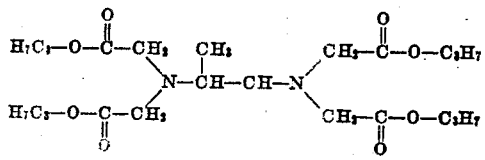

The esters of this invention will accordingly be represented by the same formulas already given herein for the corresponding acids, except of course that some or all of the carboxyl groups will be replaced by ester groups —COOR" wherein R" is the radical of an alcohol R"OH. As shown in Example II, when not all of the carboxyl groups are replaced by ester groups, the hydrogen of the unreplaced carboxyl groups may be substituted by a metal.

The esters formed by this process are useful for several purposes. For instance, the tetra-n-butyl ester of ethylene diamine N,N'-tetraacetic acid, when compounded with synthetic or natural rubber in making tire stocks, greatly reduces the aging effect caused by the heating of tires when they are run. The tetraisopropyl ester and the tetra-n-butyl ester of ethylene diamine N,N'-tetraacetic acid are also useful plasticizing agents for polyvinyl chloride and other vinyl polymers. Furthermore, the esters described herein are generally useful plasticizers for "butyl" rubber (butadiene-isobutylene copolymer), when compounded therewith in an amount of say 15% of said rubber, for example.

The nomenclature of the polycarboxylic amino acids referred to herein as starting materials is apparently not yet positively decided. Thus, ethylene diamine N,N'-tetraacetic acid is referred to by Ulrich in U. S. Patent 2,168,181 as tetramethyl-diaminoethane-tetracarboxylic acid. It may also be called N,N'-tetracarboxyl-methyl 1,2-diamino ethane, or ethylene diamine tetracarboxylic acid. This latter name is given in my copending application Serial No. 465,170, filed November 10, 1942, wherein preparation of the esters referred to herein is mentioned, and of which this application is a continuation-in-part. In this connection it should also be pointed out that these polycarboxylic amino acids may be represented by three types of formulas—internal salt, zwitter ion, and carboxylic acid—as is well known in the art of ordinary amino acids. While the carboxylic acid type of formula is shown herein and in the appended claims, it is, therefore, interchangeable with the other two types.

I claim:

1. The tetraisopropyl ester of propylene 1,2-diamine N,N'-tetraacetic acid.

2. The tetrabutyl ester of ethylene diamine N,N'-tetraacetic acid.

3. The method of preparing an ester of a polycarboxylic diamino acid, which comprises forming an addition product of said diamino acid with sulfuric acid, said addition product containing between about 1.1 and 2 mols of sulfuric acid per mol of said diamino acid, and reacting said addition product with an alcohol, with removal of water of formation, and then neutralizing the sulfuric acid and separating the resulting ester from the other products.

4. The method according to claim 3 wherein said polycarboxylic diamino acid is ethylene diamine N,N'-tetraacetic acid.

5. The method of preparing an ester of a polycarboxylic diamino acid, which comprises forming an addition product of said diamino acid with sulfuric acid by adding an excess of sulfuric acid to said polycarboxylic diamino acid and crystallizing the resulting diamino acid-sulfuric acid addition product in the form of crystals containing between about 1.1 and 2 mols of sulfuric acid per mol of said diamino acid, reacting acid crystals with an alcohol, removing water of formation, and then neutralizing the sulfuric acid and separating the resulting ester from the other products.

6. An ester of a polyacetic amino acid, said ester having the formula

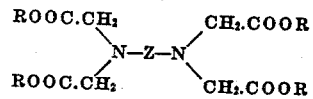

wherein each R is the radical of a lower aliphatic alcohol ROH, and Z is an alkylene group having not less than 2 and not more than 3 carbon atoms.

7. The tetra-ester of ethylene diamine N,N'-tetra-acetic acid with a lower aliphatic alcohol.

8. The tetra-ester of propylene 1,2-diamine N,N'-tetraacetic acid with a lower aliphatic alcohol.

FREDERICK C. BERSWORTH.

REFERENCES CITED

The following references are of record in the file of this patent:

UNITED STATES PATENTS

| Number | Name | Date |
|---|---|---|
| 2,135,641 | Jacobson | Nov. 8, 1938 |
| 2,103,558 | Schoeller et al. | Dec. 28, 1937 |
| 2,192,994 | De Groote | Mar. 12, 1940 |
| 2,249,134 | Hechenbleikher | July 15, 1941 |
| 2,229,034 | Moore | Aug. 18, 1942 |
| 2,296,331 | Bogemann | Sept. 22, 1942 |

FOREIGN PATENTS

| Number | Country | Date |
|---|---|---|
| 284,734 | Germany | June 4, 1915 |
| 491,877 | Germany | Feb. 14, 1930 |
| 272,290 | Germany | Mar. 28, 1914 |
| 46,892 | Netherlands | Sept. 16, 1939 |
| 638,071 | Germany | Nov. 9, 1935 |

OTHER REFERENCES

Guareschi, Chem. Zentr., vol. 1892, part I, page 382.

Franchimont et al., Rec. des trav. Chim. des Pays-Bas, vol. 7, 1888, pages 258–260.

Stadnikow, Chem. Zentr., vol. 1909, part II, page 1989.

Dubaky, Ber. Deut. Chem., vol. 49, page 1055, 1916.

Heintz, Liebigs Annalen, vol. 136, page 219 (1865).

Schlesinger, Ber. Deut. Chem., vol. 47, pages 2408–2416 (1914).

Schlesinger, Chem. Zentr., vol. 1915, part II, page 73.